United States Patent
Sivaraman Nair et al.

(10) Patent No.: US 9,910,676 B1
(45) Date of Patent: Mar. 6, 2018

(54) HARDWARE BASED XIP EXIT SEQUENCE TO ENABLE XIP MODE OPERATION ON SPI BOOT INTERFACE

(71) Applicant: Microsemi Solutions (U.S.), Inc., Aliso Viejo, CA (US)

(72) Inventors: Unnikrishnan Sivaraman Nair, Bangalore (IN); Sujaata Ramalingam, Bangalore (IN)

(73) Assignee: MICROSEMI SOLUTIONS (U.S.), INC., Aliso Viejo, CA (US)

( * ) Notice: Subject to any disclaimer, the term of this patent is extended or adjusted under 35 U.S.C. 154(b) by 149 days.

(21) Appl. No.: 14/861,451

(22) Filed: Sep. 22, 2015

(51) Int. Cl.
| | |
|---|---|
| G06F 3/00 | (2006.01) |
| G06F 13/00 | (2006.01) |
| G06F 5/00 | (2006.01) |
| G06F 13/28 | (2006.01) |
| G06F 9/44 | (2018.01) |
| G06F 13/42 | (2006.01) |
| G06F 1/24 | (2006.01) |
| G06F 1/08 | (2006.01) |

(52) U.S. Cl.
CPC .............. *G06F 9/4401* (2013.01); *G06F 1/08* (2013.01); *G06F 1/24* (2013.01); *G06F 13/4282* (2013.01)

(58) Field of Classification Search
CPC ............ G06F 9/4401; G06F 1/08; G06F 1/24; G06F 13/4282
USPC ..... 710/316, 5, 33, 36, 38, 52; 711/103, 114
See application file for complete search history.

(56) References Cited

U.S. PATENT DOCUMENTS

| 7,397,274 B1 * | 7/2008 | Tang ............. G01R 31/318516 326/16 |
|---|---|---|
| 8,788,756 B2 * | 7/2014 | Kulkarni ............ G06F 13/4291 711/114 |
| 2006/0075002 A1 * | 4/2006 | Tarbell ................ G06F 11/1415 |
| 2008/0155366 A1 * | 6/2008 | Hou ..................... G06F 13/4291 714/732 |
| 2008/0307126 A1 * | 12/2008 | Chou .................. G06F 13/4286 710/52 |

(Continued)

OTHER PUBLICATIONS

"Winbond spiflash W25Q128FW Serial Flash Memory with Dual/Quad SPI & QPI Data Sheet", publication release date: Feb. 17, 2014, Revision G.*

(Continued)

*Primary Examiner* — Farley Abad
*Assistant Examiner* — Henry Yu
(74) *Attorney, Agent, or Firm* — Leber IP Law; Dennis R. Haszko (57) ABSTRACT

Methods and apparatus are provided for controlling one or more memory devices connected to an input output (IO) circuit through a serial peripheral interface (SPI), to make any device which is in execute in place (XIP) mode exit XIP mode. An example method comprises driving an initial signal from the IO circuit onto the data pins for a first plurality of clock cycles, the initial signal causing any memory device not in XIP mode to treat subsequent signals as a dummy read, disabling a driving function of the IO circuit prior to a negative edge of a last one of the first plurality of clock cycles, stopping generation of clock signals for a transition waiting period after the first plurality of clock cycles, and activating a weak pull-up of the IO circuit to apply logic high on all of the data pins for a second plurality of clock cycles.

20 Claims, 8 Drawing Sheets

(56) References Cited

U.S. PATENT DOCUMENTS

2012/0110246 A1* 5/2012 Rolandi ............... G11C 16/26
711/103
2014/0189220 A1 7/2014 Rolandi et al.
2016/0012891 A1* 1/2016 Intrater ............. G11C 13/0069
365/148

OTHER PUBLICATIONS

Printout of "Micron N25Q serial flash data sheet", retrieved on Sep. 22, 2015 from http://www.micron.com/parts/nor-flash/serial-nor-flash/n25q256a11esf40g.

Printout of "Winbond spiflash W25Q128FW Serial Flash Memory with Dual/Quad SPI & QPI Data Sheet", publication release date: Feb. 17, 2014, Revision G, downloaded on Sep. 22, 2015 from http://www.winbond.com/hq/product/code-storage-flash-memory/serial-nor-flash/?_locale=en&partNo=W25Q128FW.

Printout of "Macronix MX25U256 Serial flash data sheet", retrieved on Sep. 22, 2015 from http://www.macronix.com/en-us/Product/Pages/ProductDetail.aspx?PartNo=MX25U25635F.

Printout of "Everspin MR10Q010 MRAM data sheet", retrieved on Sep. 22, 2015 from http://www.everspin.com/serial-peripheral-interface.

* cited by examiner

HARDWARE BASED XIP EXIT SEQUENCE TO ENABLE XIP MODE OPERATION ON SPI BOOT INTERFACE

FIELD

The present disclosure relates to controlling memory devices such as, for example, serial NOR FLASH/MRAM memory devices.

BACKGROUND

Serial NOR FLASH/MRAM is a type of non-volatile memory (similar to EEPROM) which is typically used for storing programs to be executed by processors. The memories are also used to store transitional data or for logging events in high speed telecommunication products. The memories include a serial peripheral interface (SPI). An SPI controller interfaces the memory with the processor.

The SPI NOR flash memories are available from a size of few Mbits up to 2 Gigabits currently. There are currently NOR flash memories from multiple vendors (e.g. Micron, Winbond, Macronix, Spansion) available in the market. Though the general functional behavior of all these flash memories is similar there are minor implementation and operational differences across them. MRAM on the other hand is currently believed to be available from a single vendor (Everspin). The current available size of MRAM is 1 Mbits, although the size of MRAM is expected to go higher in the future.

Serial NOR flash/MRAM memories typically support a Quad SPI interface consisting of one clock pin, a chip select pin and four data pins. The clock and chip select pins are always driven by SPI controller. The Quad SPI interface may be operated in traditional Standard SPI mode, Extended SPI mode, Dual mode as well as Quad mode. In all these modes, clock and chip select pins are used in same fashion. The data lane usage in each mode is different. In Standard SPI mode, two data lanes are operated in uni-directional mode, one as input and the other one as output. In Dual mode, two data lanes are operated in bi-directional mode. In Quad mode, four data lanes are operated in bi-directional mode. In extended mode, part of the SPI transfer happens in standard mode while remaining operations are performed with data lanes similar to dual/quad mode.

Figure 1:
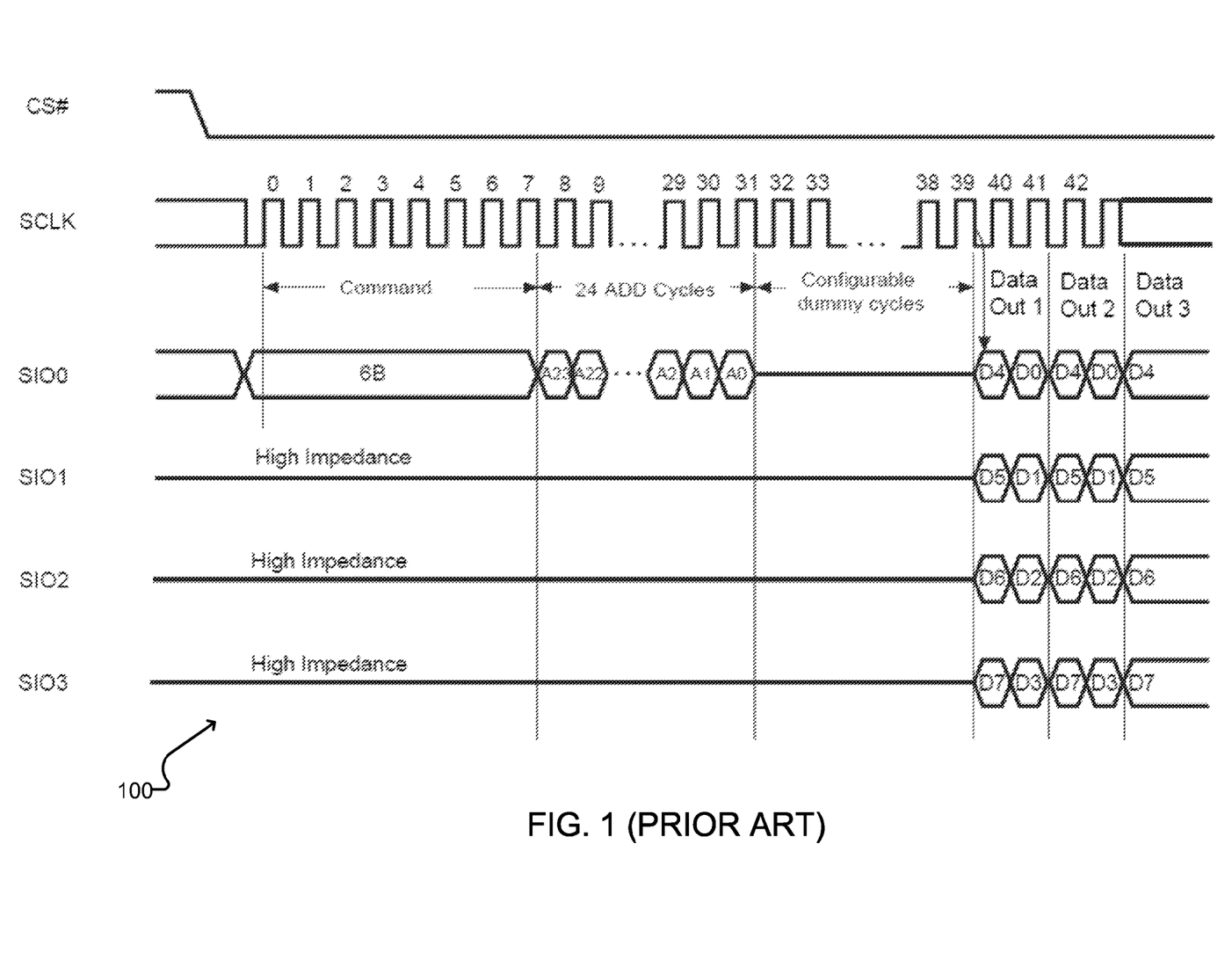
FIG. 1 is an example timing diagram illustrating signals from a SPI controller according to the prior art.

Typically, to perform any operation on FLASH/MRAM (read, write, etc.) the SPI controller provides a clock signal and instructions on one or more data lanes (up to a maximum of four data lanes) after asserting the memory chip select. The instructions comprise of an OPCODE (a number corresponding to a particular operation such as read/write), followed by relevant information to complete the operation. The memory interprets the first 8 bits of data received after chip select assertion as the OPCODE of a new instruction. For example, in case of a fast read operation, the first 8 bit OPCODE is followed by memory address for which the operation is to be performed against, followed by dummy clock cycles, and followed by memory posting the read data. The number of dummy clock cycles required varies based on the fast read mode and the memory vendor. FIG. 1 shows an example timing diagram 100 illustrating how an SPI controller generates clock (SCLK), chip select (CS#) and data signals (SIO0, SIO1, SIO2, SIO3). In the illustrated example the SPI controller performs a Quad output fast read (OPCODE=0x6B) on an example NOR flash memory. In this mode the OPCODE and address are provided on single lane (SIO0) while data is read on four lanes.

FLASH/MRAM memory devices support many read modes, mostly differentiated by the number of data lanes used for transferring OPCODE, ADDRESS and DATA. Table 1 lists the various read modes supported by SPI flash/MRAM memory devices.

TABLE 1

| Read Mode | Mode Identifier | # Data Lines for OPCODE | # Data Lines for Address | # Data Lines for Data |
|---|---|---|---|---|
| READ | OPCODE = 0x03 | 1 | 1 | 1 |
| FAST READ | OPCODE = 0x0B | 1 | 1 | 1 |
| DUAL OUTPUT FAST READ (DOFR) | OPCODE = 0x3B | 1 | 1 | 2 |
| DUAL INPUT/OUTPUT FAST READ (DIOFR) | OPCODE = 0xBB | 1 | 2 | 2 |
| QUAD OUTPUT FAST READ (QOFR) | OPCODE = 0x6B | 1 | 1 | 4 |
| QUAD INPUT/OUTPUT FAST READ (QIOFR) | OPCODE = 0xEB | 1 | 4 | 4 |
| Full Dual (DIO) | Identified by memory internal configuration | 2 | 2 | 2 |
| Full Quad (QIO) | | 4 | 4 | 4 |
| Execute in Place (XIP) | Device-specific sequences required to enter/exit XIP (XIP enter sequences include an OPCODE to select read mode). | No OPCODE | Depends on the OPCODE used while entering XIP. (e.g., 4 address, 4 data for OPCODE 0xEB) | |

The initial modes in which the OPCODE is sent on the single data lane, the mode itself is identified based on the OPCODE value. For full Quad/Dual modes where OPCODE is also sent on 4/2 lanes, the SPI controller needs to pre-configure the Flash/MRAM device. There are minor variations across various memory devices on how to pre-configure the device for these operating modes.

The XIP mode is a special read mode supported by memory vendors, to maximize read performance. The XIP mode is only a mode for reading and none of the currently available FLASH/MRAM memory devices support a similar mode (without OPCODE) for performing writes. In XIP mode, the memory does not require an OPCODE and is only provided with a read address. The memory interprets all transactions on the SPI interface as read transactions without OPCODE till XIP mode is exited. The number of bit lanes used for transferring address and data in XIP mode depends on the read OPCODE used while entering XIP mode as noted in Table 1 above.

Table 2 shows the benefit of using XIP mode based on the throughput and latency observed in verification for various read modes in different read scenarios.

TABLE 2

| Read mode | Continuous sequential read throughput | | 32 byte random read throughput | | 4 byte random read throughput | | Read latency | |
|---|---|---|---|---|---|---|---|---|
| | Mbps | % QOFR | Mbps | % QOFR | Mbps | % QOFR | ns | % QOFR |
| QOFR | 384.16 | 100 | 202.64 | 100 | 47.11 | 100 | 630 | 100 |
| QIOFR | 384.98 | 100.21 | 237.23 | 117.06 | 64.66 | 137.25 | 410 | 65.07 |
| QIO | 385.17 | 100.26 | 252.84 | 124.77 | 73.82 | 156.69 | 350 | 55.55 |
| XIP (in QIOFR) | 385.41 | 100.32 | 259.35 | 127.99 | 78.46 | 166.54 | 330 | 52.38 |

Though all current memory device vendors support such a mode, the name of the mode can change across vendors; some call it XIP (execute in place) others call this mode as "Performance enhance mode" or "Continuous read mode". There are also implementation differences between devices from different vendors. For example, devices from different vendors use different signal values sent during dummy cycles to enter and exit XIP mode, as discussed further below.

Figure 2:
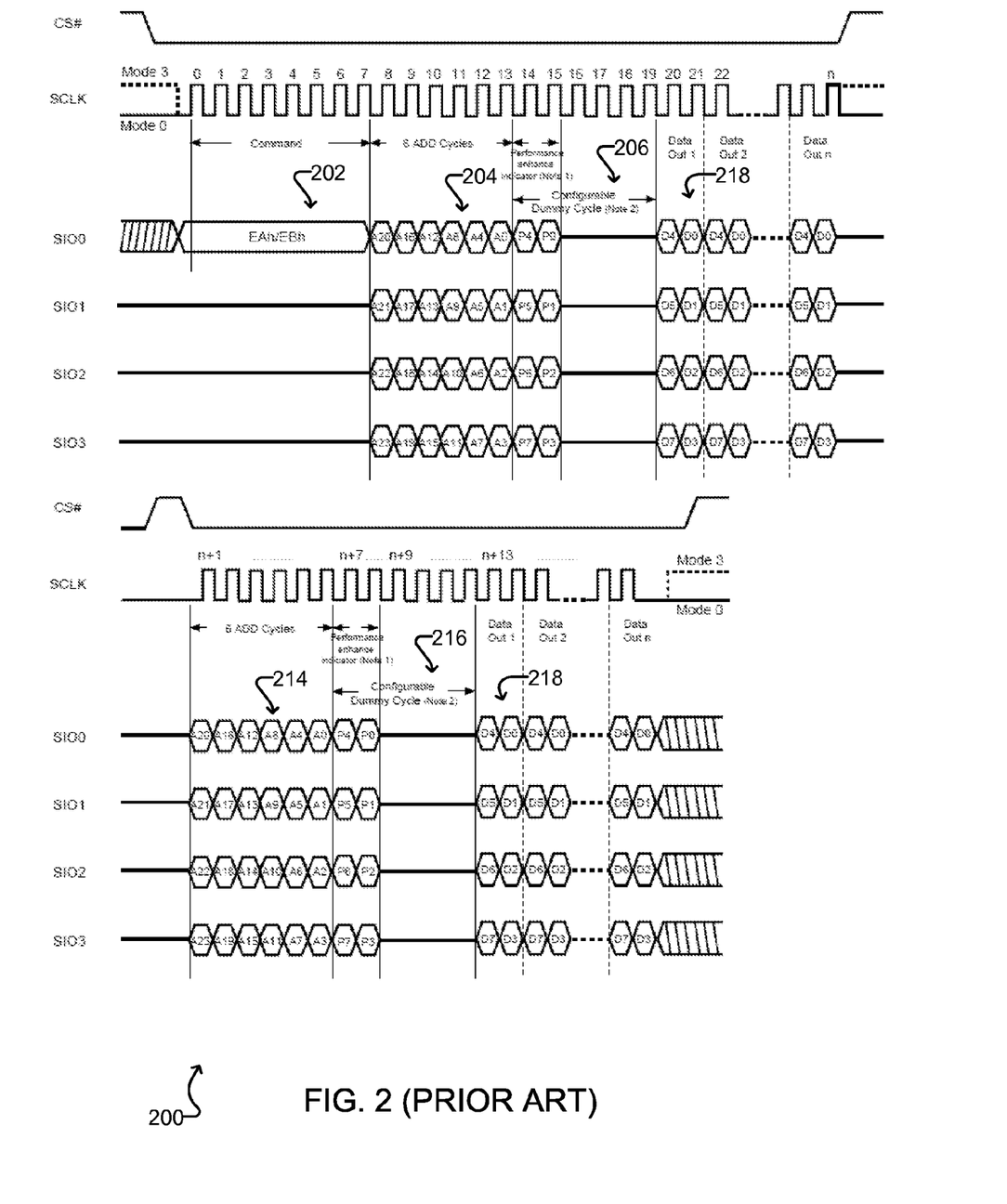
FIG. 2 is an example timing diagram illustrating an SPI controller reading data from an example memory device in XIP mode according to the prior art.

FIG. 2 shows an example timing diagram 200 illustrating how XIP mode is entered in an example Macronix flash memory with 0xEB (QIOFR mode). In the illustrated example, a read OPCODE 202 (EAh/EBh) is provided on one data line (SIO0) followed by address 204 followed by a pattern 206 (dummy cycle value) which puts the memory device into XIP mode. The read OPCODE 202 determines the number of data lines to be used in XIP mode. The example XIP entry sequence of FIG. 2 includes the OPCODE (EAh/EBh) for QIOFR mode, so all four data lines are used for addresses and data. Once in XIP mode data is read out 218 on all four data lines. A subsequent address 214 is provided on all four data lines, and after a configurable number of dummy cycles 216, data is again read out 218. Repeated reads may be performed without any intervening OPCODEs while in the XIP mode.

XIP mode is the highest throughput, lowest latency read mode supported by SPI NOR flash/MRAM memories, in which the memory does not require a read OPCODE on chip select assertion. The flash/MRAM implementation on how to enter and exit XIP varies across memory vendors. Not all memory vendors support enabling XIP mode by default using non-volatile configuration registers. So in general, on a boot interface, a SPI controller starts reading in basic modes where most memory devices behave in similar fashion. Based on the initial boot code the SPI controller moves to XIP mode for enhanced performance. The challenges in following the boot scheme include handling a chip warm reset where only the SPI controller gets reset while the SPI memory device does not get power cycled. The SPI controller on receiving the reset goes back to basic read mode while the SPI memory device remains in XIP mode, causing re-boot failures.

The inventors have determined a need for improved methods and apparatus for controlling SPI memory devices.

BRIEF DESCRIPTION OF THE DRAWINGS

Embodiments of the present disclosure will now be described, by way of example only, with reference to the attached Figures.

DETAILED DESCRIPTION

Generally, the present disclosure provides apparatus and methods for controlling memory devices over a serial peripheral interface (SPI). Example embodiments provide for initiation of an execute in place (XIP) exit sequence which works across a variety of different memory devices with different XIP exit conditions in scenarios like chip warm reset de-assertion. Some embodiments provide an SPI controller that also supports an optional device soft reset sequence with bootstrap enable which can follow the XIP exit sequence to reset volatile configuration registers in SPI memory devices.

One aspect of the present disclosure provides an apparatus for controlling memory devices. The apparatus comprises a controller having a processor interface for communication with a processor, an input output (IO) circuit having a serial peripheral interface (SPI) for communication with one or more memory devices, the SPI comprising a plurality of data pins, a clock pin, and one or more chip enable pins, and an internal bus connected between the controller and the IO circuit, the internal bus comprising a plurality of data lines, a plurality of data IO enable lines, a clock line, and one or more chip enable lines. The controller is configured to output an execute in place (XIP) mode exit sequence on the internal bus. The XIP mode exit sequence comprises an initial signal applied to the data lines for a first plurality of clock cycles, the initial signal driven on the data pins by the IO circuit to cause any memory device not in XIP mode to treat subsequent signals as a dummy read, an enable signal applied to the one or more data IO enable lines prior to a negative edge of a last one of the first plurality of clock cycles, the enable signal configured to disable a driving function of the IO circuit, a transition waiting period after the first plurality of clock cycles, wherein during the transition waiting period clock generation is stopped, and, an exit signal applied to the one or more enable lines for a second plurality of clock cycles, the exit signal configured to activate a weak pull-up of the IO circuit to apply logic high on all of the data pins for all of the second plurality of clock cycles.

The IO circuit may drive all of the data lines with logic high for at least a final one of the first plurality of clock signals. The first plurality of clock cycles may be eight clock cycles. The number of the second plurality of clock cycles may be determined based on a set of supported read modes and the devices supported on the SPI interface.

The controller may be configured to output a soft reset sequence on the data lines after the XIP mode exit sequence. The soft reset sequence may comprise a first reset waiting period, followed by a first reset signal where the value 66h is sent, followed by a second reset waiting period, followed by a second reset signal where the value 99h is sent, followed by a third reset waiting period, wherein the first reset waiting period has a configurable duration with a default of 60 ns, the second reset waiting period has a configurable duration with a default of 60 ns, and the third reset waiting period has a configurable duration with a default of 30 μs.

The controller may be configured to automatically output the XIP mode exit sequence after the controller comes out of a reset condition. The controller may be configured to automatically output the XIP mode exit sequence followed by the soft reset sequence after the controller comes out of a reset condition. The apparatus may comprise a first bootstrap pin and a second bootstrap pin, and the controller may be configured to output the XIP mode exit sequence when the first bootstrap pin is set to logic high and configured to output the soft reset sequence when the second bootstrap pin is set to logic high. The apparatus may comprise a first self-clearing configuration bit and a second self-clearing configuration bit, the first and second configuration bits being settable by firmware, and the controller may be configured to output the XIP mode exit sequence when the first configuration bit is set to logic high and clear the first configuration bit after the XIP mode exit sequence is sent, and configured to output the soft reset sequence when the second configuration bit is set to logic high and clear the second configuration bit after the soft reset sequence is sent. The apparatus may comprise a first firmware configurable register enable and a second firmware configurable register enable, and the controller may be configured to output the XIP exit mode sequence when the first firmware configurable register enable is set to logic high and configured to output the soft reset sequence when the second firmware configurable register enable is set to logic high.

One aspect of the present disclosure provides a method for controlling one or more memory devices connected to an input output (IO) circuit through a serial peripheral interface (SPI), the SPI comprising a plurality of data pins, a clock pin, and one or more chip enable pins. The method comprises driving an initial signal from the IO circuit onto the data pins for a first plurality of clock cycles, the initial signal causing any memory device not in an execute in place (XIP) mode to treat subsequent signals as a dummy read, disabling a driving function of the IO circuit prior to a negative edge of a last one of the first plurality of clock cycles, stopping generation of clock signals for a transition waiting period after the first plurality of clock cycles, and activating a weak pull-up of the IO circuit to apply logic high on all of the data pins for a second plurality of clock cycles.

The method may comprise driving all of the data lines with logic high for at least a final one of the first plurality of clock signals. The first plurality of clock cycles may be eight clock cycles and the second plurality of clock cycles may be determined based on a set of supported read modes.

The method may also comprise outputting a soft reset sequence on the data lines after the XIP mode exit sequence. The soft reset sequence may comprise a first reset waiting period, followed by a first reset signal where the value 66h is sent, followed by a second reset waiting period, followed by a second reset signal where the value 99h is sent, followed by a third reset waiting period wherein the first reset waiting period has a configurable duration with a default of 60 ns, the second reset waiting period has a configurable duration with a default of 60 ns, and the third reset waiting period has a configurable duration with a default of 30 μs.

The method may comprise automatically outputting the XIP mode exit sequence after a SPI controller comes out of a reset condition. The method may comprise automatically outputting the XIP mode exit sequence followed by the soft reset sequence after a SPI controller comes out of a reset condition. The method may comprise outputting the XIP exit mode sequence when a first bootstrap pin is set to logic high and outputting the soft reset sequence when a second bootstrap pin is set to logic high. The method may comprise outputting the XIP exit mode sequence when a first configuration bit is set to logic high and clearing the first configuration bit after the XIP mode exit sequence is sent, and outputting the soft reset sequence when a second configuration bit is set to logic high and clearing the second configuration bit after the soft reset sequence is sent.

Other aspects and features of the present disclosure will become apparent to those ordinarily skilled in the art upon review of the following description of specific embodiments in conjunction with the accompanying figures.

As discussed above, memory devices enter or exit XIP mode based on the data pin values received by the device during dummy clock cycles (e.g., P[7:0] mode bits as shown in FIG. 2) of a normal read operation. Table 3 shows conditions for entering and exiting XIP mode for various devices.

TABLE 3

| Device | Entering XIP | Exiting XIP |
| --- | --- | --- |
| Micron | P(4) = '0' | P(4) = '1' |
| Winbond | P[5:4] = "10" | P[5:4] /= "10" |
| Macronix | P[7:4] toggles with respect to P[3:0] | P[7:4] = P[3:0] |
| MRAM | P[7:0] = [0xEF] | P[7:0] = [0xFF] |

A sequence comprising of 0xFF pattern during the dummy clock cycle is effective to make the memory exit XIP mode for all memory devices of interest. Determining the location of the dummy clock cycle, however, is non-trivial. Also, there are differences between NOR Flash and MRAM memories on how many dummy clock cycles the memory supports. Most of the NOR flash memories support programmable number of dummy cycles. On the other hand, MRAM supports only fixed 2 dummy clock cycles, and all the 8 mode bits are sampled in these 2 dummy clock cycles.

XIP (execute in place) mode or Performance enhanced mode is high throughput, low latency read mode supported by most SPI NOR flash and MRAM memory devices. The implementation of how to enter and exit this mode varies across memory device vendors. The present disclosure provides apparatus and methods for providing memory devices with a generic XIP exit sequence which will work for all the NOR flash/MRAM memory devices of interest. The generic XIP exit sequence aids in enabling the XIP mode of operation in various applications like booting from SPI interface where the memory device needs to be brought out to a default state without or with limited firmware intervention.

One of the main use cases for NOR FLASH/MRAM memory devices is for storing the boot code. It is generally advantageous to operate the SPI boot memory device in XIP mode since read throughput and latency are critical in this application. But most currently available memory devices do not support SPI controllers initiating read operations in XIP mode on power up. Because of the minor implementation variations across different vendor memory devices, the sequence to be followed to enter the XIP mode is also different.

One possible solution for implementing SPI controllers considering the above mentioned limitations would be to start booting in either basic READ mode (0x03) or may be QOFR mode (0x6B) and then based on the initial boot code read from the memory move to XIP mode for better performance.

One important challenge in following the above scheme is in handling a warm reset of an ASIC device which includes a SPI controller. A typical reason for a warm reset is watch dog timer expiry. In warm reset, only the SPI controller gets asynchronous reset, without power cycling the SPI flash/MRAM memory device on the board. If a warm reset is received while SPI controller is operating in XIP mode, the controller goes back to basic read mode. The SPI flash/MRAM memory remains in XIP mode. Because of this the processor will not be able to re-boot after a warm reset. To address this issue, the SPI controller would also need to bring the SPI memory out of XIP mode on warm reset. Sending an XIP exit sequence once the SPI controller comes out of reset is challenging since the sequence has to work across multiple memory devices with varying implementation. Even though all the memory devices of interest exit XIP mode on receiving a 0xFF value during the first dummy cycle, the locations of the dummy cycles can differ and it is non-trivial to find out the location of dummy cycles. The location of the dummy cycle depends on the read mode in which the XIP mode was entered before reset. Further, such XIP exit sequence should also not create any ill effect if a memory device was not in XIP mode while the warm reset is received.

Another challenge is supporting a common XIP exit sequence for MRAM and Flash. The issue is due to the fact that MRAM supports only fixed 2 clock dummy cycles (where it receives mode bits). The number of dummy cycles in NOR flash is programmable. For example, in XIP mode, on sending exit pattern, MRAM starts driving the IO PADs (the circuits that drive the input output (IO) pins) on the 9th clock edge (after 6 address and 2 dummy cycles). In the case of NOR flash operating in 4 byte addressing mode, the SPI controller needs to drive for at least 10 clocks for the flash to exit XIP mode. If a NOR flash pattern is used, it results in IO PAD contention for 2 clock cycles in case of MRAM.

One alternate solution is to use dedicated hard reset pin of memory device to bring it to a default state. This is a partial solution since all the memory devices (FLASH/MRAM) do not support a dedicated hard reset pin. Also this solution requires on more chip IO which adds to the cost. Many memory devices support a command based soft reset sequence which could be used to bring the device to a default state. But the soft reset sequence also does not help when in XIP mode since the memory device does not decode the command itself when it is in XIP mode.

For devices with on chip ROM (where first level of booting happens from internal ROM code followed by booting from SPI memory), the SPI XIP exit sequences could be implemented inside the internal boot ROM code. This is not a preferred solution because of multiple reasons. First of all, there are many devices which do not include internal BOOTROM where this solution would not apply. Secondly, adding XIP exit firmware sequences inside the BOOTROM increases boot code complexity resulting in high verification effort and risk of boot failure.

A generic and complete method which can bring the SPI controller and SPI memories to same default operating mode on reset, for all devices without any firmware intervention is required to support XIP mode of operation on a boot interface. The method should work for all the flash/MRAM memories of interest without causing any hardware issues like contention between circuits driving input output (IO) pins (each referred to as an IO PAD).

In order to support XIP mode of operation on SPI boot interface the challenges and problems mentioned above must be addressed.

The present disclosure provides an apparatus for controlling memory devices. The apparatus comprises an SPI controller configured to issue a XIP exit sequence once the SPI controller comes out of reset, which will bring any SPI memory devices (NOR flash/MRAM) out of XIP mode. In certain preferred embodiments, the initiation of the XIP exit sequence is fully under hardware control and does not require any firmware intervention.

This makes it suitable for boot applications. The XIP exit sequence is generic and will work for all SPI memory devices of interest (NOR Flash from Micron, Macronix, Winbond and MRAM from Everspin).

The SPI controller will initiate the XIP exit sequence regardless of whether the memory was in XIP mode or not. The generic sequence disclosed herein will be treated as a dummy read command if the memory device is not in XIP mode, and as such does not result in an illegal command or transaction on the SPI interface. Accordingly, there is no explicit requirement to do a soft reset of a SPI flash memory device for successful operation of the memory after XIP exit. The XIP exit sequence also uses a weak pull up to avoid any IO contention scenarios. The processor accessing an SPI memory device need not be aware of the XIP exit sequence for that device as the SPI controller will make sure that no read requests posted by the processor will be lost while the XIP exit sequence is in progress. Details of the generic XIP exit sequence are described below.

A major advantage of the use of a generic XIP exit sequence as disclosed herein is that it addresses the above stated challenges and problems without any additional cost. Most memory devices have defined a command based soft reset sequence to bring them to a default state. This command does not take effect when the memory device is in XIP mode. Methods and apparatus implementing XIP exit sequences as disclosed herein also support generating the soft reset sequence after the XIP exit sequence, which can be enabled separately using a bootstrap. The combination of XIP exit sequence and soft reset sequence enables bringing the memory device to its default state when the SPI controller comes out of a warm reset.

In order for an XIP exit sequence to operate as expected, the memory device should not be configured in full dual/quad modes. Although the XIP exit sequence will force the device out of XIP mode even if the memory device is configured in full dual or quad mode, if the memory device is configured in full dual or quad mode but is not in XIP mode, then it will sample an invalid command on receipt of an XIP exit sequence. Also the soft reset sequence will not execute as expected since the commands are posted on single lanes. This is not a major restriction because of multiple reasons. First of all, the XIP mode with QIOFR provides better read throughput compared to the full dual/quad modes. Also the full dual/quad mode is typically not a recommended mode of operation since these modes restrict firmware/hardware flexibility due to their implementation variations across FLASH/MRAM memory devices.

Figure 3:
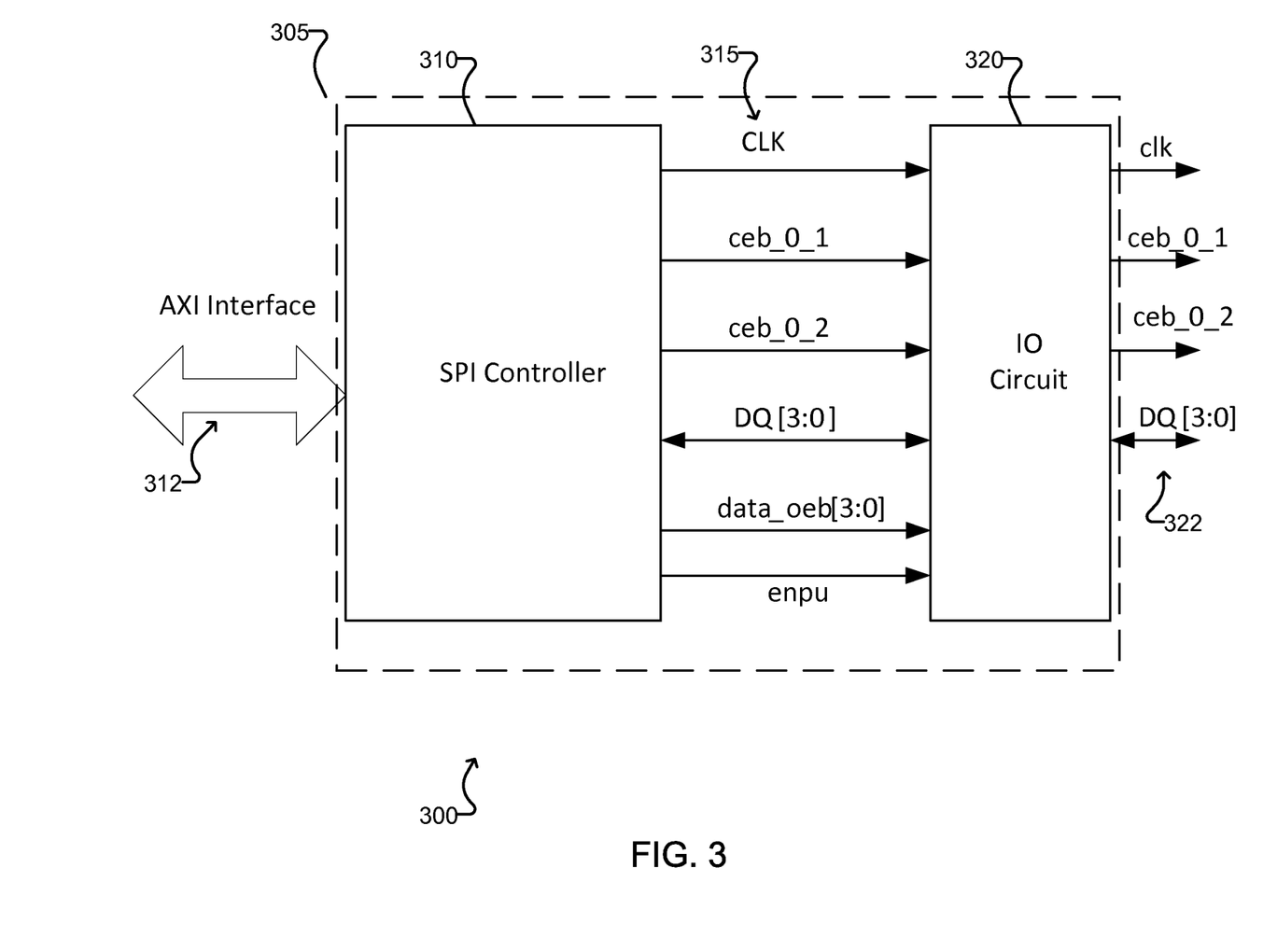
FIG. 3 shows an example apparatus for controlling SPI memory devices according to one embodiment.

FIG. 3 shows an example apparatus 300 for controlling SPI memory devices according to one embodiment of the present disclosure. Apparatus 300 comprises an SPI controller 310 configured to implement a generic XIP exit sequence as described below. The controller 310 is connected to an IO circuit 320 by an internal bus 315. The controller 310 has an AXI interface for connecting to a processor. The IO circuit 320 has an SPI interface 322 for connecting to one or more memory devices. The controller 310, internal bus 315 and IO circuit 320 are all implemented in a single chip 305 in some embodiments. In the illustrated embodiment, the SPI interface 322 comprises a clock pin (clk), two chip select/enable pins (ceb_0_1) and (ceb_0_2) and a set of four data pins (DQ[3:0]). This configuration allows for two memory devices to be connected to the SPI interface, which share the clock and data pins. In other embodiments, different numbers of pins may be provided, for example to allow different numbers of memory devices to be connected.

The internal bus 315 comprises a clock line (CLK), two chip select/enable lines (ceb_0_1) and (ceb_0_2) and a set of four data lines (DQ[3:0]), corresponding to the pins of the SPI interface 322. The internal bus 315 also comprises a set of four data IO enable lines (data_oeb[3:0]), which are used to control whether the IO circuit 320 writes to or reads from the respective data pins of the SPI interface 322, and a pull-up enable line (enpu), which is used to enable a weak pull-up of the IO circuit 320. When the weak pull-up is enabled, the data pins of the SPI interface 322 are all held at logic '1'.

Figure 4:
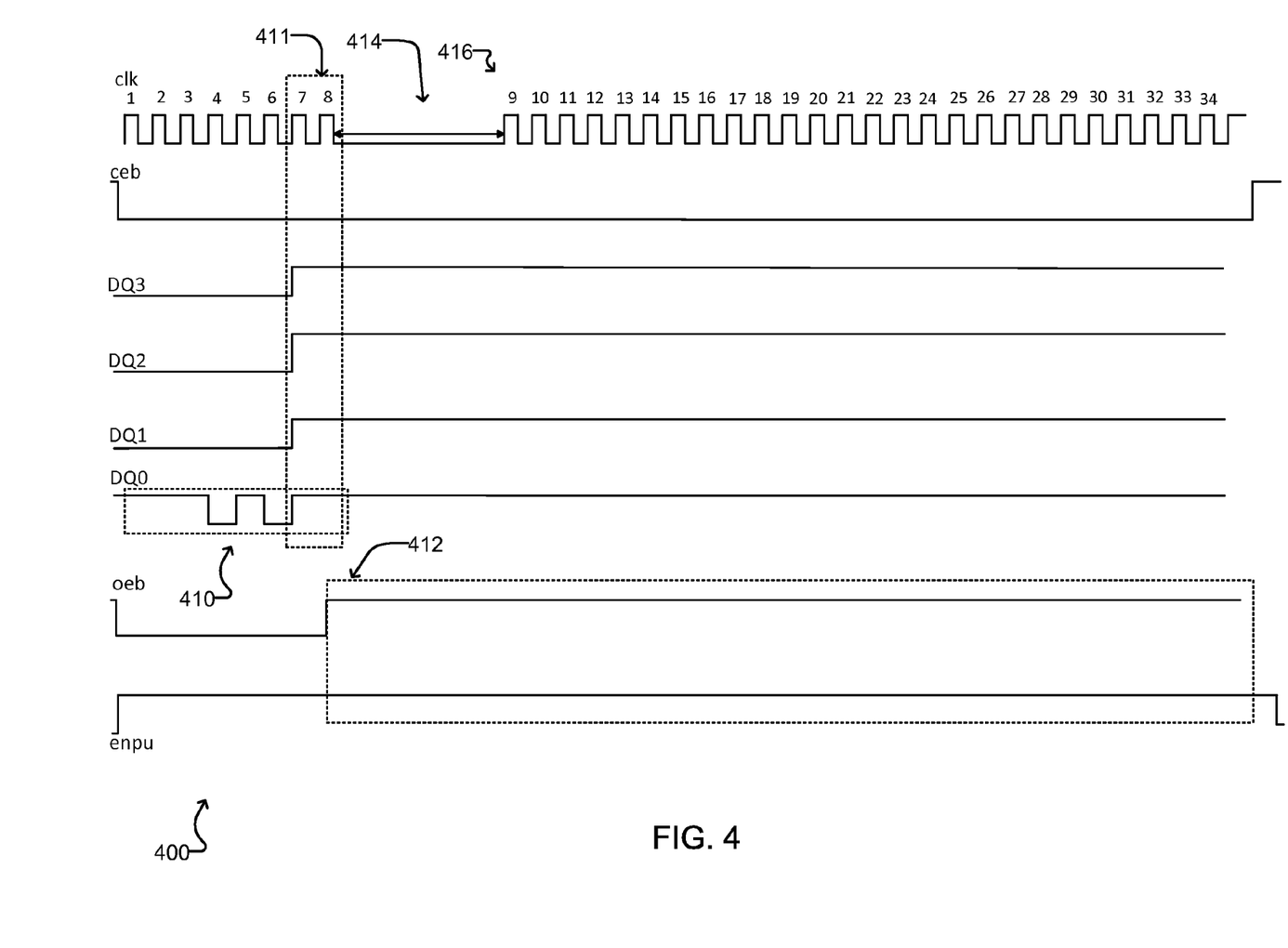
FIG. 4 shows an example XIP exit sequence according to one embodiment.

FIG. 4 shows an example XIP exit sequence 400 which may be implemented by an SPI controller such as the SPI controller 310 of FIG. 3. In some embodiments the controller is configured to generate the XIP exit sequence 400 automatically when coming out of a reset. The following signals are shown in FIG. 4:

clk—SPI interface clock signal;
ceb—SPI interface signal on an enable pin of an IO circuit driving a memory device chip select;
DQ[3:0]—SPI interface signals on data pins of the IO circuit driving memory device data ports;
oeb—Internal signal driven by SPI controller which when logic '0' enables output drivers for the DATA IO PADs of the IO circuit 320 (in normal operations, each of the DATA IO PADs are enabled/disabled separately; during the XIP exit sequence, all DATA IO PADs are enabled/disabled together);
enpu—Internal signal driven by SPI controller which when logic '1' enables weak pull-up on DATA IO PADs of the IO circuit when oeb is logic '1'.

The generic SPI XIP exit sequence consists of sending a specific data pattern on four data lanes of the Quad SPI interface for pre-defined number of clocks as shown in the timing diagram of FIG. 4. The chip select of the memory device will be asserted throughout the sequence and any memory connected to the SPI interface will exit XIP mode within the sequence. The exact number of clock cycles after chip select assertion on which the memory exits the XIP mode depends on the memory vendor and the read mode in which the memory device entered the XIP mode.

The XIP exit sequence 400 comprises, for the first eight clock cycles, an initial signal 410. The initial signal 410 comprises a value of 0xEB sent on DQ0 (Data lane 0), and a value of 0x03 sent on the other three data lanes, for the first eight clock cycles. Before the negative edge of the eighth clock, the SPI controller applies a signal 412 to the internal bus, such that the IO circuit stops driving the IO PADs, and a weak pull-up is enabled on all the four data lanes. When the IO circuit is not driving the IO PADs and the weak pull-up is enabled, the data pins of the IO circuit act like voltage sources with high resistance, such that data logic '1' is presented with relatively low current (in comparison to the current when driving the IO PADs).

The XIP exit sequence 400 comprises a transition waiting period 414 after the enable signal 412, wherein the clock generation is stopped for 50 ns to avoid any glitch sampling by the memory device during transition of the IO PADs from driving mode to weak pull up mode. After the waiting period 414, the XIP exit sequence 400 comprises an exit signal 416. The exit signal 416 is generated by keeping the data lanes pulled up for twenty-six (26) more clock cycles to end the XIP exit sequence 400. After the exit signal 416 chip select is de-asserted.

The initial signal 410, which sends 0xEB on DQ0 for the first eight clock cycles, causes any memory device which is not in XIP mode to receive a QIOFR read command and perform a dummy read. The underlying assumption is that the memory device is not in full quad/full dual mode (which is not a recommended operating mode for many controllers as discussed above). The data on the other data lanes are not very relevant for the first 6 clock cycles. On the 7th and 8th clock cycles (indicated at 411 in FIG. 4) the data on all the four data lanes are sampled as the XIP mode bits by any memory device which entered in XIP in QIOFR mode operating in 3 byte addressing mode. Such a memory device which samples 0xFF during the dummy cycles will exit XIP mode on next chip select de-assertion.

Another reason for driving all the data lanes to active high value on the eighth clock edge is to bring the IO PAD outputs to a logic high value before enabling the weak pull-up. Otherwise the IO PAD's weak pull-up driver would take quite a long time (charging time typically in microseconds) to bring the IO output to a high value effectively increasing the time for XIP exit sequence. One advantage of using the IO circuit internal pull-up (compared to a constant external weak pull-up) is that it does not impact the IO PAD timing.

A memory device which entered in XIP mode in a read mode other than QIOFR mode, or which is in 4 byte addressing mode, will sample the required pattern (all ones) for exiting XIP mode at some point within the next 26 clock cycles. For example, a memory device which entered XIP mode in QIOFR and 4 byte addressing mode will sample 0xFF on 9th and 10th clock cycle and will be able to exit XIP on next chip select de-assertion. Though the memory devices will start driving the read data on the subsequent clocks, PAD contention never occurs since the IO PADs are in weak pull-up mode, rather than being driven with data. The IO PADs are pulled up only after 8 clocks since no memory device will start driving the read data before 8 clocks.

A memory device which entered XIP mode in single mode would ideally require a 40 clock cycle pattern to sample 0xFF as dummy cycle mode bits. However, the example embodiment shown in FIG. 4 provides a pattern lasting 34 clock cycles (8 clock cycles for the initial signal 410 and 26 clock cycles for the exit signal 416) to reduce the XIP exit sequence time. In other embodiments, the exit signal 416 may be maintained for more or fewer clock cycles, as discussed below. Since Micron is the only flash memory vendor which supports entering XIP mode in single mode (in 4 byte addressing mode), and Micron devices require sampling a single bit of '1' on DATA[0] for only the first dummy clock cycle to exit XIP mode, sending FF with weak pull-up for only 26 cycles is sufficient. In some embodiments the number of clock cycles sent with data lanes pulled up can be extended if more memory devices start supporting the single mode XIP operation. MRAM also supports entering XIP mode in single mode, but since it supports only 3 byte addressing mode, it requires fewer than 26 clock cycles (FF pattern for maximum of 24 clock cycles) to exit XIP mode.

In some embodiments, the exit signal 416 may be maintained for fewer than 26 clock cycles, for example in applications where only certain read modes are to be supported. In such embodiment, the number of clock cycles for the exit signal 416 may be determined based on a set of supported modes and memory devices. The following table sets out the minimum number of clock cycles for the XIP exit sequence 400 for various sets of supported modes and devices.

The example discussed above is for one SPI memory device connected to one SPI interface. There are architectures where multiple SPI memory devices could be connected to the same SPI interface. In these cases, the clock and data lanes are shared among the memory devices while the SPI controller drives one dedicated chip select per memory device. In such architectures only one memory device should be enabled (only one chip select should be asserted) at a time while sending the XIP exit sequence. If multiple chip selects are enabled, there is possibility of IO PAD contention between memory devices which could destroy the devices in long run. In some embodiments the XIP exit pattern is sent one after the other for each memory devices for safe operation, with the chip selects asserted one by one. Such an implementation would be useful if multiple processors need to boot from multiple SPI memory devices connected to different chip selects.

In some applications it may be desirable to bring the memory device to its default state when the SPI controller gets out of reset. Currently, NOR flash memories from Micron, Winbond, Macronix and Spansion define a common soft reset sequence of two commands, namely: 0x66 followed by 0x99 with chip select de-assertion for specified

TABLE 4

| MODE WITH WHICH MEMORY DEVICE ENTERED XIP | OPCODE | CYCLE AT WHICH MEMORY DEVICE EXITS XIP | | | | | | | |
|---|---|---|---|---|---|---|---|---|---|
| | | 3 BYTE ADDRESS | | | | 4 BYTE ADDRESS | | | |
| | | MICRON | MACRONIX | WINBOND | MRAM | MICRON | MACRONIX | WINBOND | MRAM |
| Fast Read | 0x0B | 25 | NS | NS | 32 | 33 | NS | NS | NS |
| Dual Output Fast Read | 0x3B | 25 | NS | NS | NS | 33 | NS | NS | NS |
| Dual Input Output Fast Read | 0xBB | 13 | NS | 14 | NS | 17 | NS | 18 | NS |
| Quad Output Fast Read | 0x6B | 25 | NS | NS | 26 | 33 | NS | NS | NS |
| Quad Input Output Fast Read | 0xEB | 7 | 8 | 7 | 8 | 9 | 10 | 9 | NS |
| Dual I/O protocol (Full Dual) | 0xBB | 13 | NS | 14 | NS | 17 | NS | 18 | NS |
| Quad I/O protocol (Full Quad) | 0xEB | 7 | 8 | 7 | 8 | 9 | 10 | 9 | NS |

In Table 4, "NS" indicates the device does not support the XIP operation with corresponding read opcode. In embodiments where only a certain subset of modes and/or devices is to be supported, the number of clock cycles for the XIP exit sequence 400 may be determined to be equal to or greater than the highest number of cycles for any one mode/device combination in that subset. For ease of implementation, in some applications it may be preferable to use the immediate higher even number if the highest number of cycles in the subset is an odd number. For example, if only Dual Input Output Fast Read and Quad Input Output Fast Read modes are to be supported, the XIP exit sequence 400 may last for only 18 clock cycles (e.g., the highest number of cycles listed in Table 4 for DIOFR or QIOFR is 18, for a WINBOND device with 4 Byte addressing).

time in between the command codes. Combining this standard soft reset sequence along with the XIP exit sequence disclosed herein in specific order provides a generic way to bring memories to default state. A few memories like MRAM currently do not support the soft reset sequence. To have a generic method (common for FLASH/MRAM), the scheme provides separate bootstraps to enable/disable (external control) for "XIP exit sequence" and "Soft reset sequence". For example, in some embodiments bootstraps are provided as additional pins on the chip (dedicated bootstraps). In some cases, the bootstrap signal will come from a device register, which captures the value of a chip IO when the device is under reset. In the latter case the chip IO need not be dedicated bootstraps and can be used for other functionalities when chip is out of reset.

Figure 5:
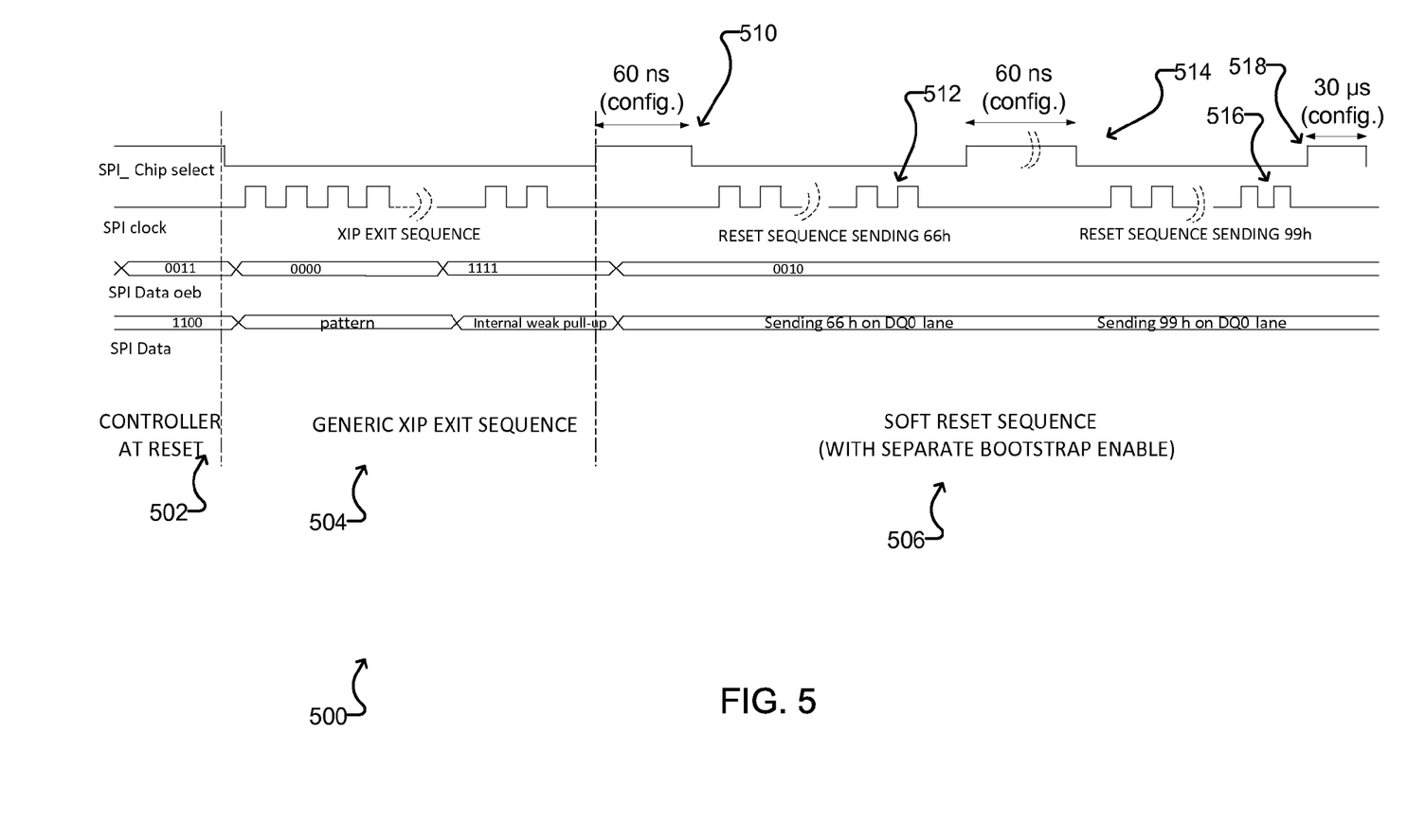
FIG. 5 shows an example XIP exit sequence followed by a soft reset sequence according to one embodiment.

FIG. 5 shows an example timing diagram 500 illustrating the SPI interface waveform when both the bootstraps are enabled. An SPI controller reset occurs at 502. An XIP exit sequence as described above is implemented during a first time period 504 after the reset, and a soft reset sequence is implemented during a second time period 506 after the reset period. The soft reset sequence comprises a first reset waiting period 510, a first reset signal 512 where the value 66h is sent, a second reset waiting period 514, a second reset signal 516 where the value 99h is sent, and a third reset waiting period 518. The commands 0x66 and 0x99 are send on only DQ0 and hence the illustrated SOFT reset sequence will not work if the memory device is in full Quad/dual mode where the commands are received on more than one data lane. Chip select is de-asserted during the first, second and third reset waiting periods 510, 514 and 518. In some embodiments the reset waiting periods 510, 514 and 518 have durations of 60 ns, 60 ns and 30 μs, respectively. Any or all waiting periods 510, 514 and 518 may be configurable.

In some embodiments the implementation of the XIP exit sequence and the soft reset sequence are sent one after the other in such a way that a combination of both the sequences can be posted to the SPI memory device either on SPI controller reset or based on firmware/processor request.

In some embodiments, generation of XIP exit sequence and SOFT reset sequence on SPI controller reset removal is controlled by following two bootstrap pins:
 a. bootstrap_xip_exit_seq:—when tied to logic '1', enables XIP exit sequence generation on SPI controller reset removal; and
 b. bootstrap_reset_seq:—when tied to logic '1', enables SOFT reset sequence generation on SPI controller reset removal.

If both the above bootstrap bits are logic '1' when the SPI controller comes out of reset, an XIP exit sequence followed by SOFT reset sequence will be generated.

In some embodiments, firmware can request to generate the XIP exit sequence or SOFT reset sequence by setting the following auto clearing configuration registers:
 a. xcbi_xip_exit_seq:—when set to logic '1' by firmware, the SPI controller generates a generic XIP exit sequence on the SPI interface and clears the configuration bit on sequence completion;
 b. xcbi_reset_seq:—when set to logic '1' by firmware, the SPI controller generates a soft reset sequence on the SPI interface and clears the configuration bit on sequence completion.

The soft reset sequence will not reset the memory if the memory device is in XIP mode. For bringing a memory device, which could be in XIP mode, to a default state, both XIP exit and reset sequence should be enabled using the bootstrap pins on which the SPI controller generates the XIP exit sequence followed by the soft reset sequence.

Figure 6:
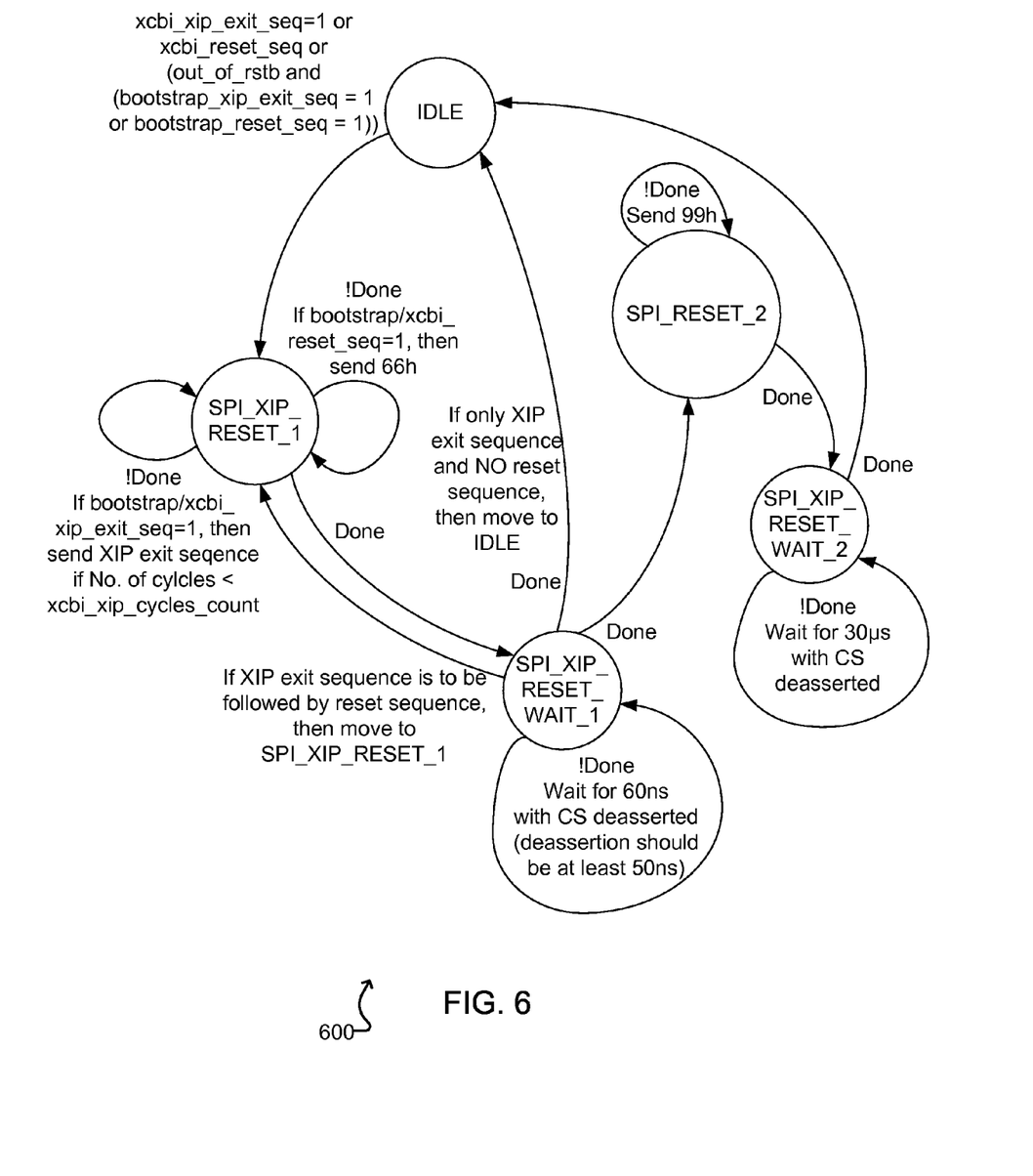
FIG. 6 is a state diagram illustrating operation of an example apparatus for controlling SPI memory devices according to one embodiment.

FIG. 6 shows a state diagram 600 illustrating operation of an example apparatus for controlling SPI memory devices according to one embodiment. In some embodiments, the XIP exit sequence/soft reset sequence is implemented as part of the main SPI controller state machine. The relevant states and state transitions are indicated in the state diagram 600 of FIG. 6. In the illustrated example, the XIP exit sequence and the first part (66h) of the reset sequence are sent from the same state in order to reduce the number of states, but in other examples these functions could be performed from separate states. The following signals are used in state machine:

1. bootstrap_xip_exit_seq, bootstrap_reset_seq, xcbi_xip_exit_seq, xcbi_reset_seq: These signals are as described above.
 2. out_of_rstb: Active high internal signal indicating the SPI controller just came out of reset. The signal gets cleared once the state machine moves out of IDLE state.
 3. xip_exit_cycles_count: This is a configurable register field defining the number of SPI clock cycles to be generated in XIP exit sequence. The default value of the field is 34 clock cycles.
 4. xip_exit_oeb_turn_around_count: This is a configurable register field defining the time for which SPI clock generation is stopped after data pad "oeb" de-assertion in terms of SPI controller internal operating clock. With the default value, the SPI controller masks the clock generation for 50 ns. This field avoids any possible glitch sampling by memory device.
 5. xcbi_reset_1_wait_time: This is a configurable register field defining the time for which the chip select is de-asserted after XIP exit sequence or after sending 0x66h command of reset sequence in terms of SPI controller internal operating clock. The memory devices minimum requirement is 50 ns. The default value ensures 60 ns.
 6. xcbi_reset_2_wait_time: This is a configurable register field defining the time for which the chip select will be de-asserted after executing the 0x99 of the reset sequence. The memory requirement is 30 μs. The default value is also 30 μs.

As discussed above, based on the bootstrap pins the state machine can generate only XIP exit sequence, only soft reset sequence or XIP exit sequence followed by soft reset sequence. The state machine flow in each of these cases is as shown in FIGS. 7 to 9.

Figure 7:
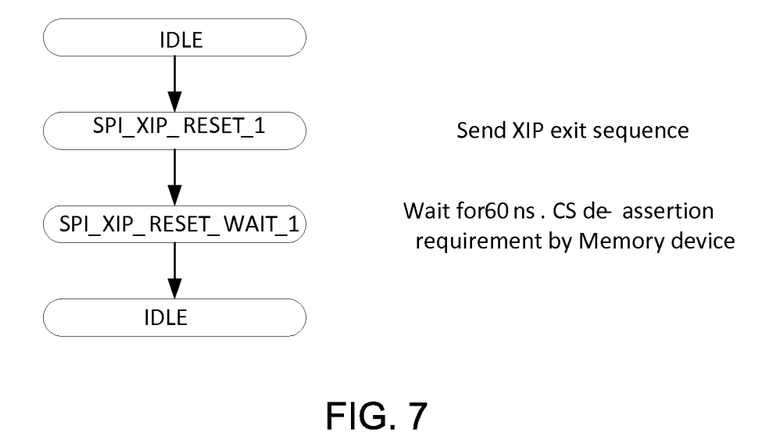
FIGS. 7, 8 and 9 are flowcharts illustrating example state transitions of an example apparatus for controlling SPI memory devices.

FIG. 7 shows the case where only an XIP exit sequence is generated on SPI controller reset. This is initiated when bootstrap_xip_exit_seq='1' and bootstrap_reset_seq='0'.

Figure 8:
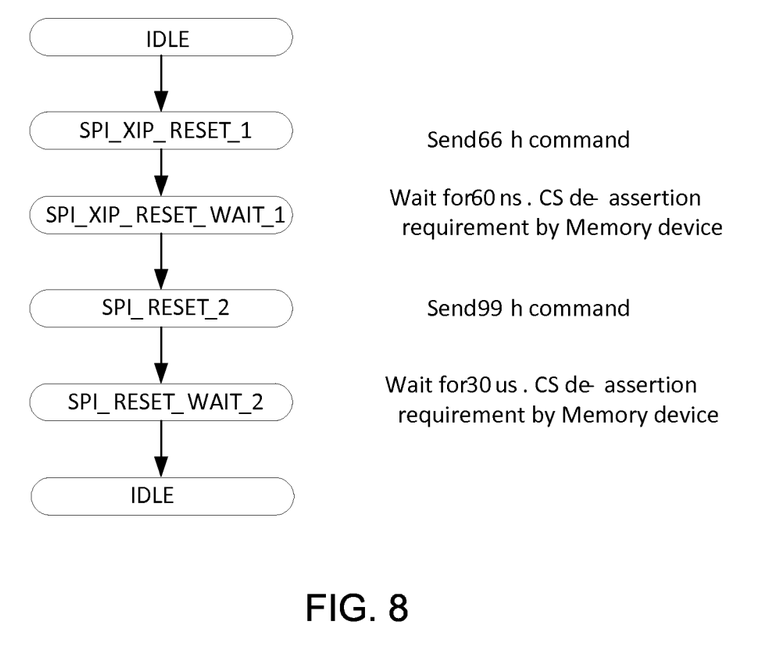

FIG. 8 shows the case where only a SOFT reset sequence is generated on SPI controller reset. This is initiated when bootstrap_xip_exit_seq='0' and bootstrap_reset_seq='1'.

Figure 9:
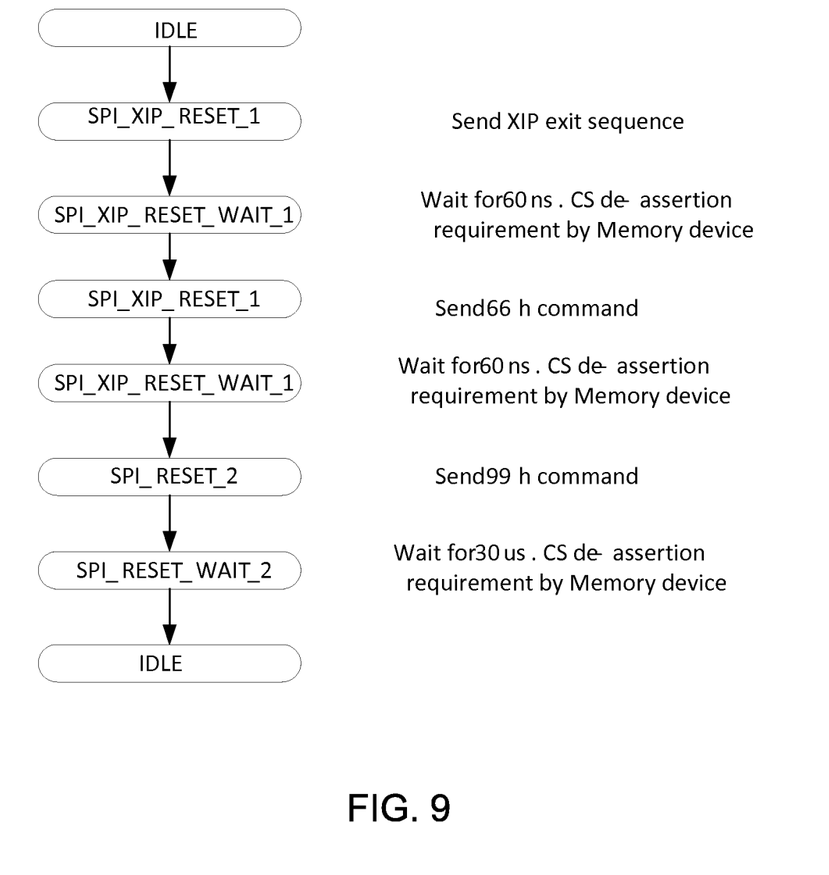

FIG. 9 shows the case where an XIP exit sequence followed by a SOFT reset sequence is generated on SPI controller reset. This is initiated when bootstrap_xip_exit_seq='1' and bootstrap_reset_seq='1'.

The following is a description of the states shown in FIGS. 6 to 9:
 1. IDLE STATE: The SPI controller is IDLE in this state and does not generate SPI clock. This is the default state and the state machine enters this state out of reset.
 2. SPI_XIP_RESET_1: The state machine enters this state if either XIP exit sequence or SOFT reset sequence generation is enabled. If both are enabled, first Exit XIP sequence is sent followed by SOFT reset sequence. During this time all the AXI memory mapped Read/Write requests are back pressured.

When sending the XIP Exit Sequence, the number of clock cycles of the Exit pattern is configurable (xip_exit_cycles_count). The default value is 34. Details of values sent on Data lanes in each cycle of the XIP exit sequence is shown in Table 5.

TABLE 5

| CYCLE | DATA LANES | VALUE |
|---|---|---|
| 1 | DQ3DQ2DQ1DQ0 | 0001 |
| 2 | DQ3DQ2DQ1DQ0 | 0001 |
| 3 | DQ3DQ2DQ1DQ0 | 0001 |

TABLE 5-continued

| CYCLE | DATA LANES | VALUE |
| --- | --- | --- |
| 4 | DQ3DQ2DQ1DQ0 | 0000 |
| 5 | DQ3DQ2DQ1DQ0 | 0001 |
| 6 | DQ3DQ2DQ1DQ0 | 0000 |
| 7 | DQ3DQ2DQ1DQ0 | 1111 |
| 8 | DQ3DQ2DQ1DQ0 | 1111 |
| 9 | DQ3DQ2DQ1DQ0 | 1111 |
| . | . | . |
| . | . | . |
| . | . | . |
| 33 | DQ3DQ2DQ1DQ0 | 1111 |
| 34 | DQ3DQ2DQ1DQ0 | 1111 |

The ENPU is enabled from the first clock cycle, but it does not have any impact until oeb is de-asserted. The initial signal transmitted on DQ0 data lane for first 8 cycles ensures that even when memory device is not in XIP, it is treated as dummy QIOFR Read. If the memory device is already in XIP and 3 byte addressing mode, then first six clock cycles are considered as Address and on the Dummy cycle (7th and 8th clock) all ones are sent to make the device exit from XIP, as discussed above. Before the Negative edge of the 8th SPI clock cycle oeb is de-asserted. Clock generation is stopped for a time period equal to xip_exit_oeb_turn_around_count (Default value 0×18*2.5 ns) to avoid any possible glitch sampling by memory devices. The weak pull up gets enabled on data pads due to already active ENPU (enable pull up) pin of the IO PAD from ninth clock cycle onwards as oeb is de-asserted.

If the memory device is already in XIP and 4 byte addressing mode, then first eight clock cycles are considered as Address and on the Dummy cycle (9th and 10th clock) week pull up gets enabled which makes the device exit from XIP. On completion of 34 clocks the state machine moves to SPI_XIP_RESET_WAIT_1.

When sending the soft reset sequence, a first reset command 66h is sent to memory device on a single data lane. Once it is sent the state machine moves to SPI_RESET_WAIT_1.

3. SPI_ XIP_ RESET_ WAIT_ 1: In this state CS is de-asserted as per the memory device requirements. Default value of CS_WAIT is 60 ns. A counter is designed to count to a Configurable Value (xcbi_reset_1_wait_time) after which state Machine moves to IDLE or Other states depending on either Only XIP sequence or Only Reset Sequence or Both has to be sent.

4. SPI_RESET_2: A second reset command 99h is sent to memory Device on a single data lane. The state machine moves to SPI_RESET_WAIT_2 state after sending 99h command.

5. SPI_RESET_WAIT_2: A time of 30 μs is required by Memory device before being re-selected after Reset Command. Default value of CS de-assertion is 30 μs. A counter is designed to count to a Configurable Value (xcbi_reset_2_wait_time) after which state Machine moves to IDLE.

The following parameters are configurable:
1. xip_exit_cycles_count;
2. xip_exit_oeb_turn_around_count;
3. xcbi_reset_1_wait_time; and
4. xcbi_reset_2_wait_time.

The current embodiment of XIP exit sequence is verified against NOR flash devices from Micron, Macronix and Winbond and MRAM device from Everspin. The sequence is expected work for other memory devices also (such as, for example NOR flash from Spansion, NvSRAM from Cypress Semiconductors).

The significance of QUAD SPI interface is increasing and has replaced traditional parallel flash/SRAM interface for these applications due to reduced pin count, lower cost and comparable/better performance. Support for higher performance modes like XIP mode on the SPI interface provides competitive advantage due to improved overall device performance.

The highest benefit for supporting XIP mode of operation (which is the highest throughput and lowest latency read mode) is derived in applications where the processor directly executes code from SPI flash/MRAM with or without caching. Specifically, XIP mode support on boot interface considerably improves initial program execution time from SPI flash/MRAM resulting in reduced boot time. Since XIP exit sequence is implemented completely in hardware which works across all the interested memory devices without any customer implementation restrictions and firmware overhead, the XIP support will be a value add for all memory control devices having an SPI interface.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. An apparatus for controlling memory devices, the apparatus comprising:
a controller having a processor interface for communication with a processor;
an input output (IO) circuit having a serial peripheral interface (SPI) for communication with one or more memory devices, the SPI comprising a plurality of data pins, a clock pin, and one or more chip enable pins; and
an internal bus connected between the controller and the IO circuit, the internal bus comprising a plurality of data lines, a plurality of data IO enable lines, a clock line, and one or more chip enable lines,
wherein the controller is configured to output an execute in place (XIP) mode exit sequence on the internal bus, the XIP mode exit sequence comprising:
an initial signal applied to the data lines for a first plurality of clock cycles, the initial signal driven on the data pins by the IO circuit to cause any memory device not in XIP mode to treat subsequent signals as a dummy read;
an enable signal applied to the one or more data IO enable lines prior to a negative edge of a last one of the first plurality of clock cycles, the enable signal configured to disable a driving function of the IO circuit;
a transition waiting period after the first plurality of clock cycles, wherein during the transition waiting period clock generation is stopped; and
an exit signal applied to the one or more enable lines for a second plurality of clock cycles, the exit signal configured to activate a weak pull-up of the IO circuit to apply logic high on all of the data pins for all of the second plurality of clock cycles.

2. The apparatus of claim 1 wherein the IO circuit drives all of the data lines with logic high for at least a final one of the first plurality of clock signals.

3. The apparatus of claim 1 wherein the first plurality of clock cycles is eight clock cycles.

4. The apparatus of claim 1 wherein a number of the second plurality of clock cycles is determined based on a set of supported read modes and memory devices.

5. The apparatus of claim 1 wherein the controller is configured to output a soft reset sequence on the data lines after the XIP mode exit sequence.

6. The apparatus of claim 5 wherein the soft reset sequence comprises a first reset waiting period, followed by a first reset signal where the value 66h is sent, followed by a second reset waiting period, followed by a second reset signal where the value 99h is sent, followed by a third reset waiting period, wherein the first reset waiting period has a configurable duration with a default of 60 ns, the second reset waiting period has a configurable duration with a default of 60 ns, and the third reset waiting period has a configurable duration with a default of 30 µs.

7. The apparatus of claim 1 wherein the controller is configured to automatically output the XIP mode exit sequence after the controller comes out of a reset condition.

8. The apparatus of claim 5 wherein the controller is configured to automatically output the XIP mode exit sequence followed by the soft reset sequence after the controller comes out of a reset condition.

9. The apparatus of claim 6 comprising a first bootstrap pin and a second bootstrap pin, wherein the controller is configured to output the XIP mode exit sequence when the first bootstrap pin is set to logic high when the controller comes out of reset, and configured to output the soft reset sequence when the second bootstrap pin is set to logic high when the controller comes out of reset.

10. The apparatus of claim 6 comprising a first self-clearing configuration bit and a second self-clearing configuration bit, the first and second configuration bits being settable by firmware, wherein the controller is configured to output the XIP mode exit sequence when the first configuration bit is set to logic high and clear the first configuration bit after the XIP mode exit sequence is sent, and configured to output the soft reset sequence when the second configuration bit is set to logic high and clear the second configuration bit after the soft reset sequence is sent.

11. The apparatus of claim 6 comprising a first firmware configurable register enable and a second firmware configurable register enable, wherein the controller is configured to output the XIP mode exit mode sequence when the first firmware configurable register enable is set to logic high and configured to output the soft reset sequence when the second firmware configurable register enable is set to logic high.

12. A method for controlling one or more memory devices connected to an input output (IO) circuit through a serial peripheral interface (SPI), the SPI comprising a plurality of data pins, a clock pin, and one or more chip enable pins, the method comprising:
driving an initial signal from the IO circuit onto the data pins for a first plurality of clock cycles, the initial signal causing any memory device not in an execute in place (XIP) mode to treat subsequent signals as a dummy read;
disabling a driving function of the IO circuit prior to a negative edge of a last one of the first plurality of clock cycles;
stopping generation of clock signals for a transition waiting period after the first plurality of clock cycles; and
activating a weak pull-up of the IO circuit to apply logic high on all of the data pins for a second plurality of clock cycles.

13. The method of claim 12 wherein the IO circuit drives all of the data lines with logic high for at least a final one of the first plurality of clock signals.

14. The method of claim 12 wherein the first plurality of clock cycles is eight clock cycles and the second plurality of clock cycles is determined based on a set of supported read modes and memory devices.

15. The method of claim 12 outputting a soft reset sequence on the data lines after the XIP mode exit sequence.

16. The method of claim 15 wherein the soft reset sequence comprises a first reset waiting period, followed by a first reset signal where the value 66h is sent, followed by a second reset waiting period, followed by a second reset signal where the value 99h is sent, followed by a third reset waiting period wherein the first reset waiting period has a configurable duration with a default of 60 ns, the second reset waiting period has a configurable duration with a default of 60 ns, and the third reset waiting period has a configurable duration with a default of 30 µs.

17. The method of claim 12 comprising automatically outputting the XIP mode exit sequence after a SPI controller comes out of a reset condition.

18. The method of claim 16 comprising automatically outputting the XIP mode exit sequence followed by the soft reset sequence after a SPI controller comes out of a reset condition.

19. The method of claim 16 comprising outputting the XIP mode exit mode sequence when a first bootstrap pin is set to logic high when a SPI controller comes out of reset, and outputting the soft reset sequence when a second bootstrap pin is set to logic high when a SPI controller comes out of reset.

20. The method of claim 16 comprising outputting the XIP mode exit mode sequence when a first configuration bit is set to logic high and clearing the first configuration bit after the XIP mode exit sequence is sent, and outputting the soft reset sequence when a second configuration bit is set to logic high and clearing the second configuration bit after the soft reset sequence is sent.

* * * * *